United States Patent [19]
Bishop et al.

[11] 3,946,375
[45] Mar. 23, 1976

[54] REDUNDANT DC POWER SUPPLY FOR ANALOG COMPUTERS AND THE LIKE

[75] Inventors: Marion M. Bishop, Seattle; Walter Robert Weist, Bellevue, both of Wash.

[73] Assignee: The Boeing Company, Seattle, Wash.

[22] Filed: Oct. 7, 1974

[21] Appl. No.: 512,503

[52] U.S. Cl.................. 340/253 C; 307/44; 307/51
[51] Int. Cl.²...................... G08B 21/00; H02J 1/10
[58] Field of Search............ 340/249, 248 B, 253 C, 340/248 R, 253 R; 307/44, 48, 50, 51, 18, 43, 64, 65, 66, 85, 86, 92, 93, 94; 323/23; 317/52

[56] References Cited
UNITED STATES PATENTS

| | | | |
|---|---|---|---|
| 3,387,194 | 6/1968 | Banks | 307/50 X |
| 3,534,354 | 10/1970 | Galginaitis | 340/249 |
| 3,738,371 | 6/1973 | Raddi et al. | 307/48 X |

Primary Examiner—John W. Caldwell
Assistant Examiner—Daniel Myer
Attorney, Agent, or Firm—Brown, Murray, Flick & Peckham

[57] ABSTRACT

A power supply system for analog computers and the like where reliability and fail-proof performance are paramount. At least two separate power supplies are connected in parallel to a plurality of operational amplifiers contained in separate channels of an analog control system. Isolation diodes are used to prevent a short-circuit in one power supply from being reflected into the other supply and causing loss of both.

3 Claims, 2 Drawing Figures

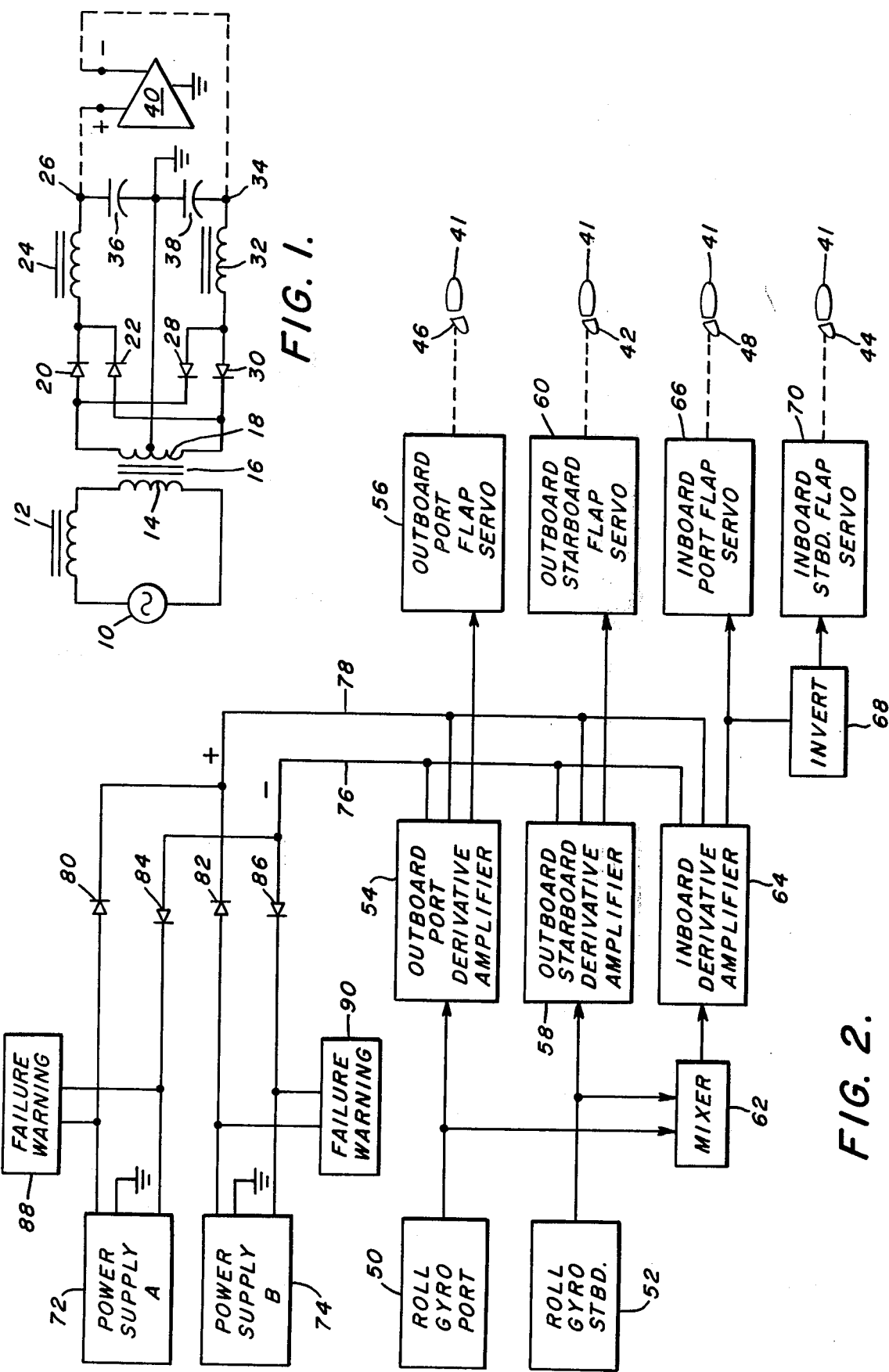

REDUNDANT DC POWER SUPPLY FOR ANALOG COMPUTERS AND THE LIKE

BACKGROUND OF THE INVENTION

While not limited thereto, the present invention is particularly adapted for use in analog control systems for aircraft, hydrofoils and the like where a high degree of redundancy is required for safety purposes.

In a hydrofoil seacraft, for example, the hull of the craft is lifted out of the water by means of foils which are carried on struts and usually pass through the water beneath the surface thereof. In passing through the water, and assuming that sufficient speed is attained, the foils create enough lift to raise the hull above the surface and, hence, eliminate the normal resistance encountered by a ship hull in passing through the water.

In the usual case, there are forward and aft foils both provided with control flaps similar to those used on aircraft. The other essential control element is the rudder which pierces or is submerged beneath the surface of the water and may be either forward or aft of the craft, depending upon its design. In most hydrofoils, the flaps or control surfaces are used to cause the craft to ascend or descend and to control the craft about its pitch and roll axes. However, they can also be used in combination with the rudder to bank the ship about its roll axis during a turn. Flaps are also used to stabilize the craft during movement on water so that pitching or rolling motions can be minimized by proper counter-balancing and movement of the flaps.

A control system of the type described above is disclosed and claimed in copending application Ser. No. 302,559, filed Oct. 31, 1972, now Pat. No. 3,886,884, and assigned to the assignee of the present application. In the system described in the aforesaid copending application, inboard and outboard starboard flaps are utilized on the aft foil together with inboard and outboard port flaps. These are independently controlled so as to provide a greater degree of safety in the event that one flap should fail on either port or starboard side. Additionally, separate port and starboard roll gyros are utilized. Signals from these roll gyros are applied through separate channels to the respective port and starboard flaps. In certain types of hydrofoil controls, there are three signal channels, one for the outboard starboard flap, a second for the outboard port flap, and the third of which feeds both of the inboard control flaps.

In the past, and in an attempt to improve safety, a separate direct current power source was provided for each of the signal channels leading from the roll gyros to the control flaps. Originally, it was thought that the only really dangerous hard-over condition for a hydrofoil craft was a situation wherein all four aft flaps went hard-over in a direction which produced maximum roll moment on the craft. It was for this reason that the roll function and automatic control systems for hydrofoils were divided into two separate roll channels, each provided with its own power supply. It is now recognized, however, that a hard-over condition involving only two aft flaps, if one is outboard, is potentially dangerous. This could occur in the prior art system described above where separate power supplies were provided for each signal channel. That is, if the power supply for any one channel were to fail, at least two flaps would go hard-over and produce a dangerous condition.

SUMMARY OF THE INVENTION

In accordance with the present invention, the possibility of a hard-over failure of two aft flaps in a hydrofoil control system is eliminated by connecting two or more power supplies in parallel across all signal channels rather than providing a single, separate power supply for each channel. Redundancy of this type reduces the probability of a hard-over condition to a negligible level. Isolation diodes are utilized to prevent a short-circuit in one parallel-connected power supply from being reflected to another and causing the loss of both. It should be understood, of course, that the invention is not limited to hydrofoils, but is applicable to any case where multiple signal channels are employed for redundancy purposes.

Specifically, there is provided in accordance with the invention a power supply system for operational amplifiers and other circuit components utilized in a control system employing a plurality of signal channels, which comprises a first separate direct current power supply and one or more other direct current power supplies. Each power supply has a terminal which is positive with respect to a point of common potential and a terminal which is negative with respect to the point of common potential. Diodes poled to conduct current in one direction connect the positive terminals of the respective power supplies to terminals adapted for connection to a source of positive potential in all of the aforesaid signal channels; while diodes poled to conduct current in the opposite direction connect the negative terminals of the respective power supplies to terminals in all of the channels adapted for connection to a source of negative potential. In this manner, should one power supply fail, the other automatically takes over to supply current to all signal channels. At the same time, the diodes prevent a short-circuit in one power supply from being reflected into the other and causing the loss of both. Further, in accordance with the invention, a failure warning device is provided on each supply which allows operation of the control system to be suspended for repair action on a defective power supply.

The above and other objects and features of the invention will become apparent from the following detailed description taken in connection with the accompanying drawings which form a part of this specification, and in which:

FIG. 1 is a schematic circuit diagram illustrating a typical power supply of the type utilized in the present invention and the manner in which it is connected to a typical operational amplifier in an analog computer; and FIG. 2 is a block schematic diagram of one embodiment of the invention as applied to the roll control system for a hydrofoil seacraft.

With reference now to the drawings, and particularly to FIG. 1, there is shown a typical direct current power supply of the type with which the present invention may be used. It includes a source of alternating current voltage 10 connected through inductor 12 to the primary winding 14 of a transformer 16. A center tap on the secondary winding 18 of transformer 16 is connected to ground as shown. Opposite ends of the secondary winding 18 are connected through diodes 20 and 22 and inductor 24 to the positive terminal 26 of the direct current power supply. Similarly, the two ends of the secondary winding 18 are connected through diodes 28 and 30 and inductor 32 to the negative terminal 34 of the direct current power supply. Diodes 20 and 22, it will be noted, are poled to conduct current in a direction opposite that of diodes 28 and 30 to produce on terminals 26 and 34 positive and negative voltages, respectively, with respect to ground. The inductors 24 and 32 form with capacitors 36 and 38 filter networks for filtering DC ripple currents.

In the usual case, the positive and negative terminals 26 and 34 are connected to the corresponding terminals of operational amplifiers in an analog control system, one of said amplifiers being diagrammatically shown in FIG. 1 and identified by the reference numeral 40. If a direct current power supply such as that of FIG. 1 should fail, a hard-over failure of the control system can occur. In this respect, large amplitude hard-over failures can cause large, potentially hazardous responses if the hard-over signal path is maintained. On the other hand, most "dead" or degraded gain failures such as complete lack of, or reduced control signal, are benign.

One application for the present invention is shown in FIG. 2, this comprising a roll control system for a hydrofoil craft. As was explained above, the hydrofoil craft is provided with forward and aft foils, the aft foils 41 being provided with a set of starboard flaps and a set of port flaps. The starboard flaps are identified by the reference numerals 42 and 44; whereas the port flaps are identified by the reference numerals 46 and 48. Each flap of each set (i.e., port and starboard) is independently controlled to improve the safety characteristics of the craft.

There is provided in the hydrofoil a port roll gyro 50 and a starboard roll gyro 52. The output of the port roll gyro 50 is applied to an outboard port derivative amplifier 54 which processes the output of the gyro in combination with signals from other circuit components, not shown herein for purposes of simplicity. However, for a description of the complete system, reference may be had to the aforesaid copending application Ser. No. 302,559. The output of the amplifier 54 is then applied to an outboard port flap servo 56 which controls the flap 46.

Similarly, the output of the starboard roll gyro 52 is applied to an outboard starboard derivative amplifier 58 where it is processed with other signals in appropriate operational amplifiers. The output of the outboard starboard derivative amplifier 58 is then applied to the outboard starboard flap servo 60 which controls the outboard starboard flap 42. Finally, the outputs of both gyros 50 and 52 are applied to a mixer 62, the output of the mixer being applied to an inboard derivative amplifier 64 where it is processed in operational amplifiers with other signals and applied directly to the inboard port flap servo 66 and inverted in inverter 68 and applied to the inboard starboard flap servo 70. Servos 66 and 70, in turn, control the inboard port flap 40 and inboard starboard flap 44, respectively.

The system shown in FIG. 2 employs three derivative amplifiers; however it will be appreciated that only two can be employed if desired, in which case the amplifier 54, for example, will control both the inboard as well as the outboard port flaps. The important point, of course, is that separate signal channels are utilized for the respective port and starboard flaps, or at least the outboard flaps, to prevent an unstable roll condition should one signal channel fail.

As was explained above, in previous systems of this type, separate power supplies were utilized for each of the signal channels such that if one power supply failed, only one signal channel would fail and the remainder would remain operational. In this respect, and as was explained above, it was originally thought that the only real dangerous hard-over condition in a hydrofoil craft is if all four aft flaps go hard-over in a direction which produces a maximum roll moment on the craft. It has now been found, however, that a hard-over failure of only two aft flaps, particularly if one is an outboard flap, is potentially dangerous. Accordingly, failure of any one of the separate power supplies for the respective signal channels could cause a potentially hazardous hard-over condition.

In accordance with the present invention, a plurality of power supplies is provided for all signal channels in a control system employing multiple signal channels, the power supplies being connected in parallel to each of the signal channels. Thus, there are provided two power supplies 72 and 74 each of which is similar to the power supply shown in FIG. 1. The two power supplies are connected to two power leads 76 and 78 in parallel, these two leads being connected to the operational amplifiers and other circuit elements in the derivative amplifiers 54, 58 and 64. These same power leads, of course, can be connected to other circuit elements such as the servos shown in FIG. 2. The positive terminals of power supplies 72 and 74 are connected through diodes 80 and 82 to the positive power lead 78; whereas the negative terminals of the power supplies 72 and 74 are connected through diodes 84 and 86 to the negative power lead 76. The diodes 80–86 isolate the respective power supplies and prevent a condition wherein a short in power supply 74, for example, will not cause a power drain from power supply 72.

Should either power supply 72 or 74 fail, a failure warning device 88 or 90 will be activated. When a warning device is activated, normal operation of the hydrofoil or other device being controlled can be suspended for repair action.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. A power supply system for operational amplifiers and other circuit components utilized in a control system employing a plurality of signal channels, comprising a first separate direct current power supply, a second separate direct current power supply, both of said power supplies having a terminal which is positive with respect to a point of common potential and a terminal which is negative with respect to the same point of common potential, diodes poled to conduct current in one direction connecting said positive terminals to terminals in all of said channels adapted for connection to a source of positive potential, and the diodes poled to conduct current in the opposite direction connecting said negative terminals to terminals in all of said channels adapted for connection to a source of negative potential whereby said diodes are connected in such a manner so as to prevent a short in one power supply from draining current of both positive and negative potential from another power supply.

2. The power supply system of claim 1 including positive and negative power leads connecting said power supplies to all of said circuit components, said diodes including a first pair having their cathodes connected to the positive power lead and their anodes connected to the positive terminals of the respective power supplies, and said diodes including a second pair having their anodes connected to the negative power lead and their cathodes connected to the negative terminals of the respective power supplies.

3. The power supply system of claim 1 including failure warning devices connected across each of said power supplies for indicating a failure of that power supply.

* * * * *